Feb. 20, 1934.  R. J. GAROFALO ET AL  1,948,346
TREATMENT AND DEWAXING OF PETROLEUM
Filed May 9, 1932
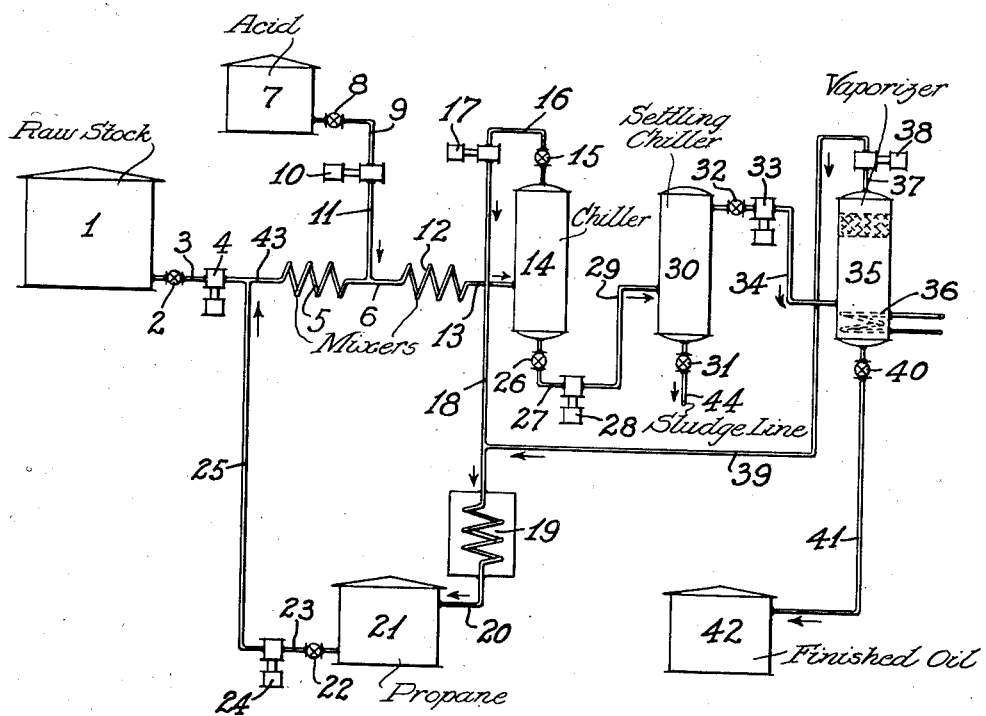
INVENTORS
Ross J. Garofalo & Claude E. Swift
BY
Philip Subkow
ATTORNEY.

Patented Feb. 20, 1934

1,948,346

UNITED STATES PATENT OFFICE 1,948,346

TREATMENT AND DEWAXING OF PETROLEUM

Ross J. Garofalo, Alhambra, and Claude E. Swift, Glendale, Calif., assignors to Union Oil Company of California, Los Angeles, Calif., a corporation of California Application May 9, 1932. Serial No. 610,136

11 Claims. (Cl. 196—18)

This invention relates to a process for the treatment and dewaxing of petroleum. More specifically, it relates to a novel process for the separation of wax, polymerizable products and certain bodies regarded as impurities in petroleum.

One of the desirable characteristics of a lubricating oil is a low pour point, i. e., a low congealing temperature. Such oils are produced from crude oil which contains no wax and also from the waxy crudes, such as those having a paraffin base, by subjecting the lubricating oil fractions to a dewaxing operation wherein a substantial portion of the wax is separated from the oil. The lubricating oil fractions produced from waxy crudes which have been separated from a substantial portion of the wax which they contain possesses the desired low pour point characteristics. Processes which are conventional in the art for the separation of wax from petroleum are centrifuging, cold settling and cold pressing.

Most lubricating oil fractions contain other undesirable bodies besides wax which must be removed if a superior finished lubricant is to be obtained. Certain unsaturated or unstable bodies occurring naturally in the lubricating oil fractions of petroleum, or formed during the process of refining, render the oil unstable to light, thus causing the oil to develop a very poor color upon storage. Furthermore, these unstable or unsaturated bodies are quite susceptible to oxidation and upon use in the crankcase of an internal combustion engine soon darken and become acidic in character. It is, therefore, important that these bodies be removed by proper treatment in order to produce a finished lubricating oil which is free from these undesirable characteristics. Chemical treatment is the conventional method now employed for the removal of these bodies. The oil is treated with a suitable quantity of sulphuric acid which has the property of forming in combination with these undesirable bodies a heavy material which is separable from the oil by gravity settling and which is known as sludge or acid resin.

The customary sequence employed for the separation of these unsaturated or unstable bodies and wax from lubricating oil consists in heating the oil with acid for the removal of the sludge or resin forming bodies and then subjecting the acid treated oil to one of these conventional dewaxing methods for the separation of the wax. The acid treatment appears to remove from the oil certain bodies present which inhibit the separation of the wax; therefore, by acid treating the oil prior to dewaxing operation more efficient removal of the wax is obtained.

We have discovered a method wherein the acid treating step and dewaxing step can be carried out in one operation. Our process consists in forming an acid resin in the oil in a finely divided state and then agitating and immediately chilling the oil to a temperature sufficiently low to cause a substantial precipitation of the wax present. The sludge bodies or acid resins formed by the acid treatment function as nuclei for the agglomeration of the precipitated wax. Upon settling the heavy agglomerated particles of sludge and wax settle out and the treated oil may be decanted away from these impurities. By immediately chilling the acid treated oil the sludge particles or nuclear bodies remain as discrete bodies and present a large adherent surface for the wax as it is subsequently precipitated by the chilling operation. Slow chilling after formation of the acid sludge or resins is undesirable as these acid reaction particles tend to coalesce or unite and thereby destroy their agglomerating effect upon the wax.

In producing the sludge particles or acid resins, we find it highly desirable to employ a temperature range above the congealing points of most waxy oils thus permitting proper contact between the oil and acid. Furthermore, the lower temperatures are undesirable because of the incompleteness of the reaction between the sulphuric acid and the resin or sludge forming compounds of the oil. Only the most reactive of the unstable or unsaturated bodies combine with the sulphuric acid at the lower temperatures and are removable from the oil as sludge or acid resin. In order to remove the remainder of the undesirable bodies present in the oil after acid treatment at the lower temperatures it becomes necessary to raise the temperature and then retreat the oil with a further quantity of acid. Furthermore, the remaining impurities in the oil, which are not removed by the acid treatment at the low temperatures, interfere with the precipitation of the wax. These remaining impurities repress or tend to prevent the separation of the wax from the oil at the lower temperatures, thereby causing the final product to exhibit poor pour point characteristics. By treating the oil at a temperature of approximately 70° F. with sufficient sulphuric acid to react with substantially all of these impurities which repress wax separation this difficulty can be overcome and a satisfactory separation of the wax can be obtained.

Most lubricating oils are too viscous for removal of the impurities present in the oil by our process. The agglomerated acid resin wax mixture will not settle out properly unless the oil is "thinned" down or diluted and made to be less viscous. In carrying out our process we find it desirable to dilute the oil containing wax and other impurities prior to acid treatment and chilling. As diluents for the impure oil we may use naphtha, or gasoline or other light liquid hydrocarbons; however, we prefer to use those hydrocarbons which are normally vaporous at ordinary atmospheric temperature and pressure. Such hydrocarbons as liquid ethane, propane, butane or isobutane or mixtures thereof have been found especially valuable as diluents for our process. These hydrocarbons are obtained by the "stabilization" method conventional in the natural gasoline industry. They are the light overhead fractions which may be liquefied by compression and cooling and maintained in the liquid state in suitable containers under pressure. A typical fraction has the following composition: 6.72% ethane, 72.20% propane, 19.91% isobutane and 1.17% normal butane. The pressure necessary to maintain such a fraction in the liquid state is approximately 125 pounds per square inch at 70° F. Hereafter such a fraction will be referred to as liquid propane.

After dissolving the lubricating oil fraction in a suitable solvent it is treated with sulphuric acid for the formation of the sludge or acid resins referred to above. After formation of these resins the mass is then agitated and chilled until a temperature has been attained which is sufficiently low to precipitate a substantial portion of the wax present. The constant agitation of the chilled mass insures intimate contact between the acid resin particles and the precipitated wax thereby agglomerating these materials in a form which readily settles out of the diluted oil when maintained in a quiescent state.

As means of refrigeration we may employ brine coils, direct ammonia expansion or any of the chilling methods conventionally used, however, we prefer to employ the refrigeration obtainable by employing liquid propane. By dissolving the lubricating oil fraction in liquid propane, treating the diluted oil with sulphuric acid and then vaporizing a portion of the liquid propane under reduced pressure sufficient refrigeration is obtained to precipitate a substantial quantity of the wax present. Furthermore, the ebullition accompanying the vaporization of the liquid propane under reduced pressure produces the desired agitation necessary to agglomerate the acid resin particles and precipitated wax. The propane, therefore, functions as a diluent for the oil and also as an internal refrigerant. This means of refrigeration is highly desirable as the temperature of the solvent solution of oil containing the acid resin particles can be lowered sufficiently rapid to prevent any substantial coalescence of the sludge particles before precipitation of the wax. The fine state of division of the sludge at the time of wax precipitation affords the necessary surface for proper agglomeration of the precipitated wax.

Liquid propane has a further decided advantage over other hydrocarbon diluents due to its low specific gravity (0.535 at 60° F.). The low specific gravity of this light liquid hydrocarbon permits a degree of separation of the agglomerated wax and acid resins unobtainable with other diluents. By the cold settling process it usually requires a period of from ten to twenty days to settle out the precipitated wax from the chilled oil. Furthermore, the separation is usually poor because of the small difference in specific gravity between the oil and the precipitated wax. Our method overcomes this serious disadvantage. The specific gravity of the agglomerated sludge and wax is greater than wax alone and the specific gravity of the liquid propane solution of oil is lower than oil diluted with common solvents, such as naphtha, gasoline or other heavier hydrocarbons. Thus because of the relatively heavy wax sludge particles and the relatively light propane solution of oil a rate of settling and completeness of separation of the wax-sludge mixture from the propane solution of oil is obtained which has heretofore been unobtainable where heavier oil diluents have been employed.

As a further modification of our process we may treat the oil with sulphuric acid to form acid reaction particles and then add wax antisolvents to precipitate the wax in the presence of the acid reaction particles and then separate the acid reaction products and wax together as a sludge from the acid treated oil. In case the oil is too viscous for proper treatment diluents may be employed, as have been described above, to render it less viscous. In most instances little or no refrigeration is necessary to cause thorough wax precipitation when wax antisolvents are employed. However, where moderate amounts of wax antisolvents are used it becomes necessary to chill the oil in order to obtain satisfactory separation of the wax. As wax antisolvents we may use alcohol, acetone, acetone and benzol, methyl formate, methylene dichloride, methylene dichloride and acetone or methylene dichloride and benzol. The amounts of these antisolvents necessary to effect proper separation of the wax will have to be determined for each type of oil treated.

It is, therefore, an object of our invention to separate impurities and wax from petroleum.

It is another object of our invention to chemically treat petroleum fractions and utilize the reaction products as acids in the separation of the wax content of the oil.

It is still another object of our invention to dilute petroleum fractions with liquid propane, commingle the diluted oil with sulphuric acid, agitate and chill the treated oil in the presence of the acid resins by vaporizing a portion of the propane under reduced pressure, separate the precipitated impurities from propane solution of oil and then separate the propane from the oil.

The accompanying drawing is illustrative of one form of apparatus in which we may carry out our invention.

Referring more particularly to the drawing, the wax bearing petroleum fraction in tank 1 at a temperature above its congealing point is withdrawn through valve 2 and line 3 into pump 4 which forces it through line 43 into agitator 5 where it meets a stream of liquid propane coming from tank 21 through valve 22, line 23, pump 24 and line 25. The agitation of the oil and propane in agitator 5 causes complete solution. This solution passes from agitator 5 into line 6 from whence it passes into agitator 12 where it meets a stream of sulphuric acid coming from tank 7 into valve 8, line 9, pump 10 and line 11. After thorough agitation of the propane solution of oil and acid in agitator 12 at a temperature of about 70° F. the acid treated mass passes through line 13 into chiller 14 where sufficient of the liquid propane is vaporized under reduced pressure to lower the temperature of the mass to a point sufficiently low to cause a substantial precipitation of the wax. The vaporized propane is removed from chiller 14 through valve 15 in line 16 to compressor 17 which forces it through line 18 to condenser 19 where it is liquefied and passes by means of line 20 into propane storage tank 21. The ebullition or boiling of the propane solution of oil in chiller 14 causes sufficient agitation of the mass to insure intimate contact between the acid sludge or resin particles and the precipitated wax.

The chilled mass in chiller 14 is removed through valve 27 to pump 28 which forces it through line 29 into settling chamber 30 where the heavy agglomerated particles of wax and acid resins settle rapidly from the propane solution of oil and are removed through valve 31 and line 44. The propane solution of acid treated and wax free oil is decanted away from settling chamber 30 through valve 32 into pump 33 which forces it through line 34 into vaporizer 35 where the remaining propane is vaporized by the aid of steam introduced through closed coil 36. These vapors are removed from vaporizer 35 through line 37 to compressor 38 which forces them through line 39 and line 18 into condenser 19 where they are liquefied and passes by means of line 20 into propane storage tank 21. The acid treated and wax free oil which has been separated from its propane content in vaporizer 35 is removed through valve 40 and line 41 into storage tank 42.

As has been explained above, the agglomerated mass of acid resin and wax is separated from the propane solution of oil through valve 31 and line 44. If desired, the wax may be separated from the acid resin by heating this mixture up to a point above the congealing point of the wax and allowing the fluid mass to remain in a quiescent state. The acid resin having a higher specific gravity than the molten wax settles out and permits the substantially resin free wax to be decanted away from the acid resin.

As an example of the method of carrying out our process, waxy oil in tank 1 is dissolved in agitator 5 in liquid propane. The temperature of the propane solution of oil should preferably be about 70° F. and the proportion of waxy oil to propane should be about one part of the waxy oil to five parts of the light volatile hydrocarbon solvent. The solution of waxy oil in liquid propane is then thoroughly contacted with sulphuric acid in agitator 12. The quantity of acid necessary for proper treatment depends somewhat upon the oil used but for most purposes from 30 to 50 pounds of 66° Bé. sulphuric are sufficient. The acid treated solution of waxy oil dissolved in liquid propane containing finely divided sludge then passes to chiller 14 where the temperature of the mass is immediately lowered to −10 to −30° F. by vaporization of the liquid propane under reduced pressure. The boiling or ebullition accompanying the chilling operation causes sufficient agitation or movement of the mass to insure proper contact and agglomeration of the precipitated wax upon the sludge particles.

The acid treated propane solution of oil containing the agglomerated sludge and wax then passes to settling chamber 30 where these insoluble impurities settle out and are removed through line 44. The rate of settling is usually so rapid and complete that only a few minutes are required to obtain a substantial separation of the propane solution of oil from the agglomerated wax and acid resin.

The above description is not to be taken as limiting our invention but as illustrative of one form of carrying out our invention, many variations will appear to those skilled in the art, within the scope of the following claims.

We claim:

1. A process for the treatment of oil containing wax which comprises dissolving said oil in a solvent, treating the solvent solution of oil with sulphuric acid to form nuclear wax agglomerating bodies, immediately chilling said solvent solution of oil to precipitate the wax in the presence of said nuclear wax agglomerating particles and subsequently separating the nuclear wax agglomerating particles and precipitated wax from the acid treated oil.

2. A process for the treatment of oil containing wax which comprises dissolving said oil in a light volatile liquid hydrocarbon solvent, treating said solvent solution of oil with sulphuric acid, vaporizing a portion of said solvent to immediately chill the oil and precipitate the wax in the presence of the sulphuric acid reaction particles, separating the acid reaction particles and wax from the solvent solution of oil and subsequently separating the solvent from the acid treated oil.

3. A process for the treatment of oil containing wax which comprises dissolving said oil under pressure in liquid propane, treating said propane solution of oil with sulphuric acid and forming acid reaction particles, immediately chilling and agitating the propane solution of oil and wax containing acid reaction particles to a temperature sufficiently low to precipitate the wax by vaporizing a portion of the propane under reduced pressure, separating the acid reaction particles and wax from the propane solution of oil and subsequently separating the propane from the acid treated and wax free oil.

4. A process for the treatment of oil containing wax which comprises treating said oil with sulphuric acid and forming wax agglomerating acid reaction particles, adding a wax antisolvent to percipitate the wax in the presence of said wax agglomerating particles, separating the wax agglomerating particles and wax from the acid treated oil and subsequently separating the oil from the wax antisolvent.

5. A process for the treatment of oil containing wax which comprises dissolving said oil in a diluent, treating said diluted oil with sulphuric acid to form acid reaction particles, adding acetone to precipitate the wax in the presence of the acid reaction particles, separating the acid reaction particles from the diluted oil containing acetone and subsequently separating the diluent and acetone from the acid treated and wax free oil.

6. A process for the treatment of oil containing wax which comprises dissolving said oil in liquid propane, treating said propane solution of oil with sulphuric acid to form wax agglomerating particles, adding a wax antisolvent to said propane solution of waxy oil containing wax agglomerating particles, vaporizing propane under reduced pressure to chill the propane solution of oil sufficiently to precipitate the wax and to agitate the mass during the chilling operation, separating the agglomerated acid reaction particles and wax from the propane solution of oil and wax antisolvent and subsequently separating the acid treated and wax free oil from the propane and wax antisolvent.

7. A process for the treatment of oil containing wax which comprises commingling said oil with a normally gaseous hydrocarbon diluent, treating said commingled oil with sulphuric acid to form acid reaction products, chilling the said treated oil containing acid reaction products to precipitate the wax and subsequently separating the precipitated wax and acid reaction products from the acid treated oil.

8. A process for the treatment of oil containing wax which comprises treating said oil with sulphuric acid and forming sludge in a finely divided state, precipitating the wax in the presence of said finely divided sludge and separating the sludge and wax from the said treated oil.

9. A process for the treatment of oil containing wax which comprises dissolving said oil in a normally gaseous hydrocarbon diluent, treating said diluted oil with sulphuric acid to form sludge in a finely divided state, cooling said acid treated oil to precipitate the wax in the presence of said finely divided sludge and separating the sludge and wax from the diluted acid treated oil.

10. A process for the treatment of oil containing wax which comprises dissolving said oil in a normally gaseous hydrocarbon diluent, treating said diluted oil with sulphuric acid to form finely divided sludge, vaporizing a portion of said normally gaseous hydrocarbon diluent to chill the oil and precipitate the wax, separating the sludge and wax from the acid treated oil diluted with normally gaseous hydrocarbon diluent and separating the normally gaseous hydrocarbon diluent from said acid treated oil.

11. A process for the treatment of oil containing wax which comprises diluting said oil in a light liquid hydrocarbon solvent, treating said diluted oil with sulphuric acid, immediately chilling said acid treated oil to precipitate the wax and separating the precipitate from the acid treated oil.

ROSS J. GAROFALO.
CLAUDE E. SWIFT.